United States Patent
Kim et al.

(10) Patent No.: US 8,284,374 B2
(45) Date of Patent: Oct. 9, 2012

(54) LIQUID CRYSTAL DISPLAY DEVICE

(75) Inventors: Kyeong Jin Kim, Goyang-si (KR); In Su Baik, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 997 days.

(21) Appl. No.: 12/005,622

(22) Filed: Dec. 28, 2007

(65) Prior Publication Data

US 2008/0284972 A1   Nov. 20, 2008

(30) Foreign Application Priority Data

May 18, 2007   (KR) .................. 10-2007-0048409

(51) Int. Cl.
*C09K 19/60*   (2006.01)
(52) U.S. Cl. ................................................ 349/165
(58) Field of Classification Search .......... None
See application file for complete search history.

(56) References Cited

U.S. PATENT DOCUMENTS

| | | | | |
|---|---|---|---|---|
| 5,046,823 | A | * | 9/1991 | Mori et al. ............... 349/174 |
| 5,347,378 | A | * | 9/1994 | Handschy et al. .......... 349/78 |
| 2006/0001809 | A1 | | 1/2006 | Lee et al. |
| 2006/0146249 | A1 | | 7/2006 | Choi |

FOREIGN PATENT DOCUMENTS

| | | |
|---|---|---|
| EP | 0 520 754 | 12/1996 |
| JP | 58-113286 | 7/1983 |
| JP | 63-257723 | 10/1988 |
| TW | 200632005 | 9/2006 |

* cited by examiner

*Primary Examiner* — Thanh-Nhan P Nguyen
(74) *Attorney, Agent, or Firm* — McKenna Long & Aldridge LLP

(57) ABSTRACT

A liquid crystal display device capable of improving a contrast ratio is provided. The device includes a first substrate including a first alignment film and a first polarizing film having a first transmission axis parallel to an alignment direction of the first alignment film, a second substrate including a second alignment film and a second polarizing film having a second transmission axis perpendicular to the first transmission axis of the first polarizing film, and a liquid crystal layer between the first and second substrates, the liquid crystal layer including a dichroic dye, wherein the liquid crystal is aligned in horizontal direction.

12 Claims, 7 Drawing Sheets

LIQUID CRYSTAL DISPLAY DEVICE

This application claims the benefit of Korean Patent Application No. 10-2007-048409, filed on May 18, 2007, which is hereby incorporated by reference for all purposes as if fully set forth herein.

BACKGROUND OF THE INVENTION

1. Field of the Invention

The present invention relates to a liquid crystal display device, and more particularly, to a liquid crystal display device which improved display grade through an improvement in contrast ratio.

2. Discussion of the Related Art

Recently, in connection with development an of information society, there have been demands for development of a novel image display device which improves drawbacks that a conventional cathode ray tube (CRT) has such as a heavy weight and a great bulk.

Under circumstances, various flat display devices such as LCDs (liquid crystal display devices), OLEDs (organic light emitting diodes), PDPs (plasma panel display devices), and SEDs (surface-conduction electron-emitter display devices) are getting attention.

Among these, liquid crystal display devices (LCDs), which are used in a variety of applications from a display screen of a mobile phone to a TV screen, are one of the most typical flat display devices.

LCD displays desired images by applying an electric field to a liquid crystal substance with dielectric and optical anisotropy between a pair of transparent substrates and adjusting the strength of the electric field to control the transmittance of incident light onto the substrates.

In general, an LCD includes a liquid crystal display panel for displaying images by receiving video and scan signals from outside and a backlight unit for irradiating light.

The liquid crystal display device includes a liquid crystal layer disposed between a pair of transparent substrates, and may further include a polarizing film equipped on the pair of substrates, respectively.

That is, the LCD is not a light-emitting display device which displays images by self-emitting light, rather it is a non-light-emitting display device which displays images by having light supplied from a backlight unit and controlling the transmittance of the supplied light.

In order to display high-definition images on the LCD, improvement in various image quality characteristics is in demand. Particularly, improvement in contrast ratio is important for displaying vivid images.

The contrast ratio is generally measured by dividing a white luminance by a black luminance, and particularly, reducing the black luminance is an important factor for improving the contrast ratio.

However, in an LCD, especially a normally black mode LCD, there is a problem in that a black luminance increases and a contrast ratio decreases by being unable to completely control incident light from a backlight unit when displaying a black screen.

When contrast ratio decreases, the contrast ratio of a white screen and a black screen decreases, thereby having difficulty in displaying vivid images.

SUMMARY OF THE INVENTION

Accordingly, the present invention is directed to a liquid crystal display device that substantially obviates one or more problems due to limitations and disadvantages of the related art.

An advantage of the present invention is to provide a liquid crystal display device capable of improving a contrast ratio.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the invention, as embodied and broadly described herein, a liquid crystal display device includes a first substrate including a first alignment film and a first polarizing film having a first transmission axis parallel to an alignment direction of the first alignment film, a second substrate including a second alignment film and a second polarizing film having a second transmission axis perpendicular to the first transmission axis of the first polarizing, and a liquid crystal layer between the first and second substrates, the liquid crystal layer including dichroic dye, wherein the liquid crystal is aligned in a horizontal direction.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE ILLUSTRATED EMBODIMENTS

Reference will now be made in detail to embodiments of the present invention, examples of which are illustrated in the accompanying drawings.

The present invention is directed to a liquid crystal display device including a first substrate including a first alignment film and a first polarizing film having a first transmission axis parallel to a alignment direction of the first alignment film; a second substrate including a second alignment film and a second polarizing film having a second transmission axis perpendicular to the first transmission axis of the first polarizing; and a liquid crystal layer between the first and second substrates, the liquid crystal layer including dichroic dye, wherein the liquid crystal is aligned in horizontal direction. The present invention also relates to a fringe field switching liquid crystal display panel.

The dichroic dye is characterized by absorbing light that oscillates in the parallel direction and transmitting light that oscillates in the perpendicular direction with respect to any one axis of a long axis and a short axis of the dichroic dye molecules.

Figure 1:
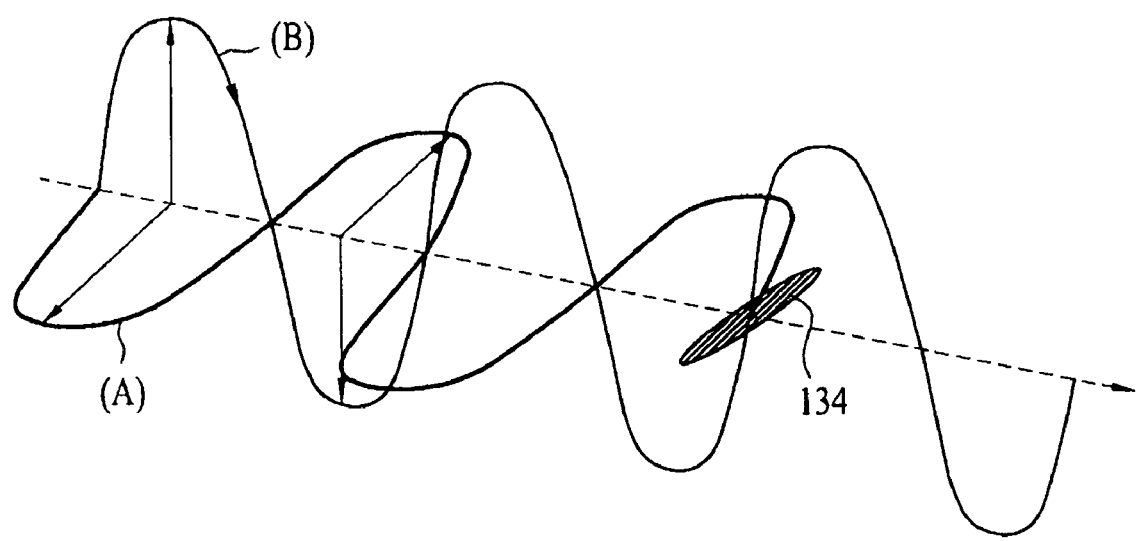
FIG. 1 is a perspective view for illustrating optical properties of a dichroic dye.

That is, as shown in FIG. 1, when unpolarized light is passes through a dichroic dye 134, light A that oscillates in the parallel direction to the long axes of the molecules is absorbed to the dichroic dye 135, and light B that oscillates in the perpendicular direction to the long axes of the molecules is transmitted.

Figure 2:
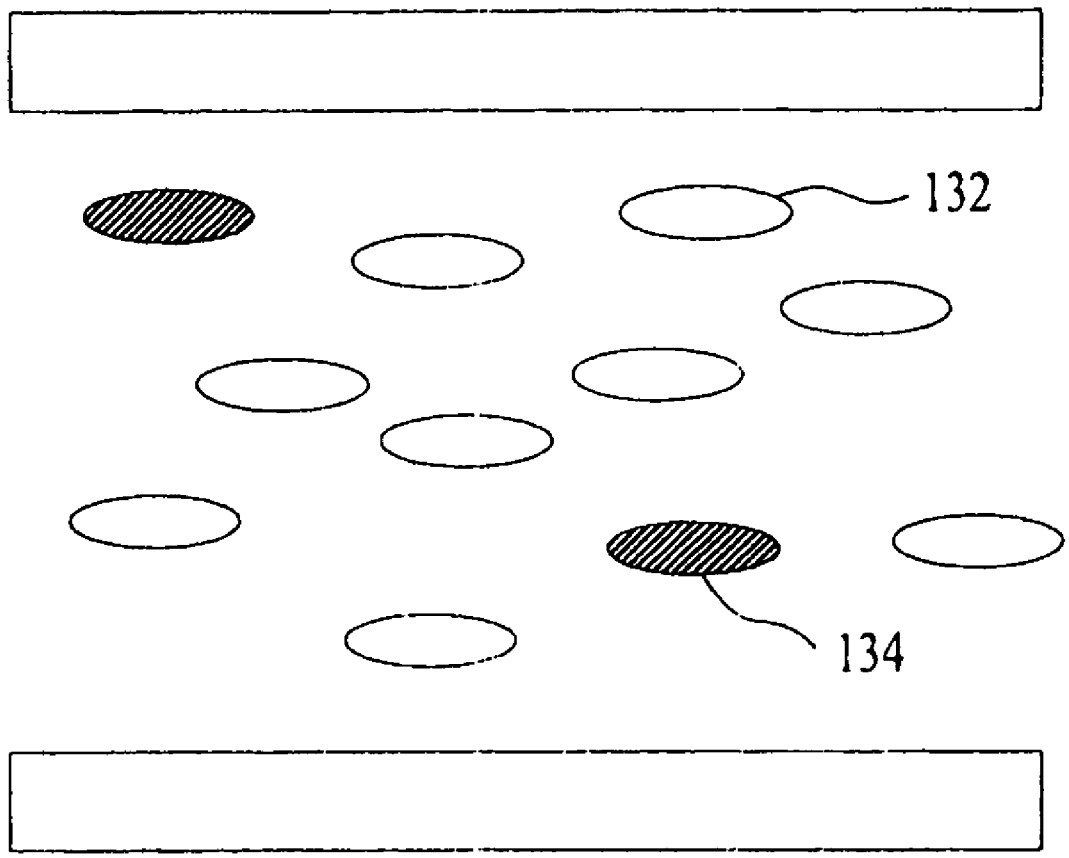
FIG. 2 is a sectional view for illustrating an arrangement relationship between dichroic dye molecules and liquid crystal molecules.

The dichroic dye is included in a small amount in the liquid crystal layer including liquid crystal molecules which are uniformly aligned in the horizontal direction. At this time, as shown in FIG. 2, the dichroic dye 134 is aligned parallel to the liquid crystal molecules 132 by a guest-host effect.

The liquid crystal display device according to the present invention arranged the transmission axis of the polarizing film in the side of light incident and the substrate in the side of light incident such that they are parallel to each other, as well as added the dichroic dye to the liquid crystal layer. Thus, the linearly polarized light, which is transmitted through the polarizing film without application of a voltage, is absorbed to the dichroic dye so as to reduce black luminance and improve the contrast ratio, thereby displaying vivid image.

Examples of the dichroic dye used in the liquid crystal display device according to the present invention include any one of an azo-based, azo-stilbene-based, benzothiazolyl polyazomethine-based, azomethine-based, merocyanine-based, methine-arylidene-based, tetrazine-based, oxadiazine-based, carbarzole-azo-based, amino-based or anthraquinon-based dichroic dye, but it is not limited thereto.

As the azo-based dichroic dye, use can be made of an azo-based compound represented by the following formula 1.

[Formula 1]

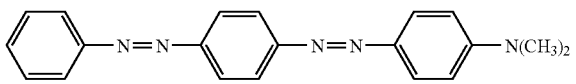

As the anthraquinone-based dichroic dye, use can be made of a compound represented by the following formula 2 or formula 3.

[Formula 2]

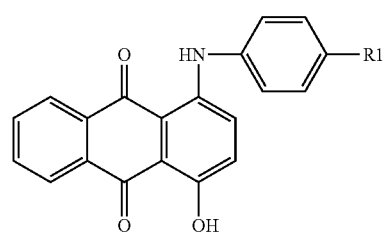

wherein, R1 is any one group from $C_4H_9$, $OC_9H_{19}$, or $N(CH_3)_2$.

[Formula 3]

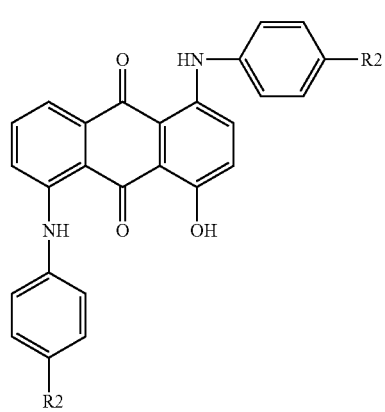

wherein, R2 is any one group from $C_2H_5$, $C_4H_9$, $OC_5H_{11}$, $N(CH_3)_2$, or $CH(CH_3)_2$.

Moreover, as the amino-based dichroic dye, use can be made of a nitro-amino-biphenyl-based compound represented by the following formula 4 or a nitro-amino tolane-based compound represented by the following formula 5.

[Formula 4]

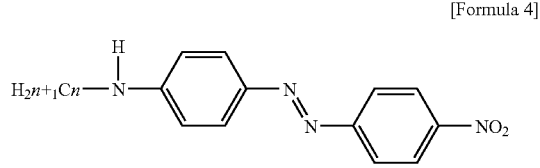

wherein, n is a natural number.

[Formula 5]

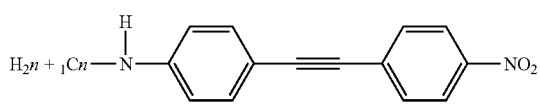

wherein, n is a natural number.

The present invention is not limited to the dichroic dyes exemplified in the above, and any type of a dichroic dye may be used as long as the dichroic dye absorbs light selectively depending on an oscillation direction of the light.

A degree of light absorption by the above-mentioned dichroic dye is shown as in the following equation 1 and equation 2.

$$A_\perp = \alpha_\perp c d \quad \text{[Equation 1]}$$

$$A_\parallel = \alpha_\parallel c d \quad \text{[Equation 2]}$$

$A_\perp$ and $A_\parallel$ are respectively an absorbance of the short axis and the long axis in the dichroic dye molecules, $\alpha_\perp$ and $\alpha_\parallel$ are respectively an absorption coefficient of the short axis and the long axis in the dichroic dye molecules, c is a concentration of the dichroic dye, and d is a cell gap.

As can be seen from the above equations, the degree of light absorption increases with increase in the concentration of the dichroic dye, thereby reducing the luminance. Thus, expressing a gray scale, i.e., gradation becomes difficult.

Therefore, the addition ratio of the dichroic dye molecules may be determined, in consideration of the contrast ratio, luminance, or the like, depending on the type and cell gap of the liquid crystal to be used.

The dichroic dye molecules may be added in an amount of, preferably 10% by weight or less, and more preferably 1% by weight or less.

The liquid crystal display device may display a black screen without applying a voltage.

Next, a liquid crystal display device according to a first embodiment of the present invention will be described.

Figure 3:
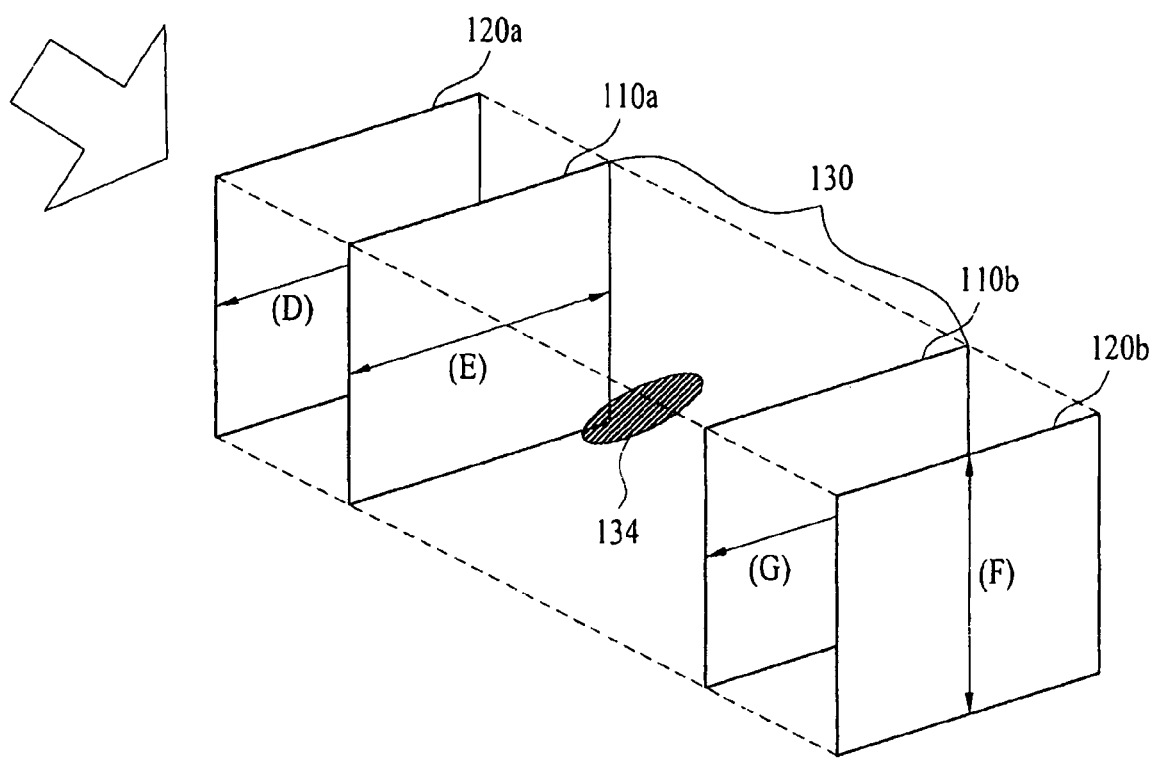
FIG. 3 is a perspective view illustrating the constitution of a liquid crystal display device according to a first embodiment of the present invention.

FIG. 3 is a perspective view illustration the constitution of the liquid crystal display device according to a first embodiment of the present invention. In the drawings accompanied herewith for reference, the same reference numerals refer to the same members.

The liquid crystal display device according to the first embodiment of the present invention is an in-plane switching mode liquid crystal display device including a first substrate 110a equipped with a first polarizing film 120a having a transmission axis D in a first direction and the first substrate 110a having an orientation E parallel to the first direction, a second substrate 110b equipped with a second polarizing film 120b having a transmission axis F perpendicular to the transmission axis in the first direction and the second substrate 110b having an orientation G parallel to the first direction, a liquid crystal layer 130 including a dichroic dye 134 disposed between the first substrate 110a and the second substrate 110b, and a backlight unit (not shown) for irradiating light from underneath the first substrate.

In FIG. 3, a respective substrate and polarizing film have been illustrated to be separated from each other for the convenience of the description. However, the respective substrate may be equipped with the respective polarizing film by attaching it.

As the first substrate 110a and the second substrate 110b, a transparent plastic substrate made of any one from a glass substrate or PET (polyethylen terephthalate), polyimide, or an epoxy resin is used.

The first substrate 110a and the second substrate 110b may be a thin film transistor array substrate and a color filter substrate, respectively.

The thin film transistor array substrate includes a plurality of gate lines, a plurality of data lines intersecting the gate lines to define a pixel region, a thin film transistor formed on the intersection region of the gate line and the data line, and a pixel electrode connected with the thin film transistor.

Moreover, the thin film transistor array substrate further includes a common electrode formed parallel to the pixel electrode to generate a horizontal electric field for realizing an in-plane switching mode.

The color filter substrate (not shown) includes a black matrix formed to define a pixel region that corresponds with the pixel region in the thin film transistor array region, and a color filter formed in the pixel region.

Further, the color filter substrate may further include an overcoat layer formed on the overall surface of the substrate including the black matrix and the color filter.

The first substrate and the second substrate are arranged so as to have their orientations parallel to each other, and the liquid crystal layer to be disposed between the substrate pair is uniformly aligned in the horizontal direction.

For example, an alignment layer is formed on the first substrate and the second substrate, and the alignment treatment can be performed by rubbing or photo aligning the alignment layer.

The first polarizing film is placed to have a transmission axis parallel to the orientation of the first substrate, while the second polarizing film is placed to have a transmission axis perpendicular to the transmission axis of the first polarizing film.

The liquid crystal layer 130 includes liquid crystal molecules driven by an electric field generated between the pixel electrode and the common electrode on the plane parallel to the substrate.

Moreover, the liquid crystal layer 130 contains a dichroic dye 134.

The dichroic dye 134 selectively absorbs only the light that oscillates parallel to the long axes in the dye molecules. The addition ratio of the dichroic dye 134 is determined, in consideration of the contrast ratio, luminance, or the like, depending on a liquid crystal to be used.

Figure 4:
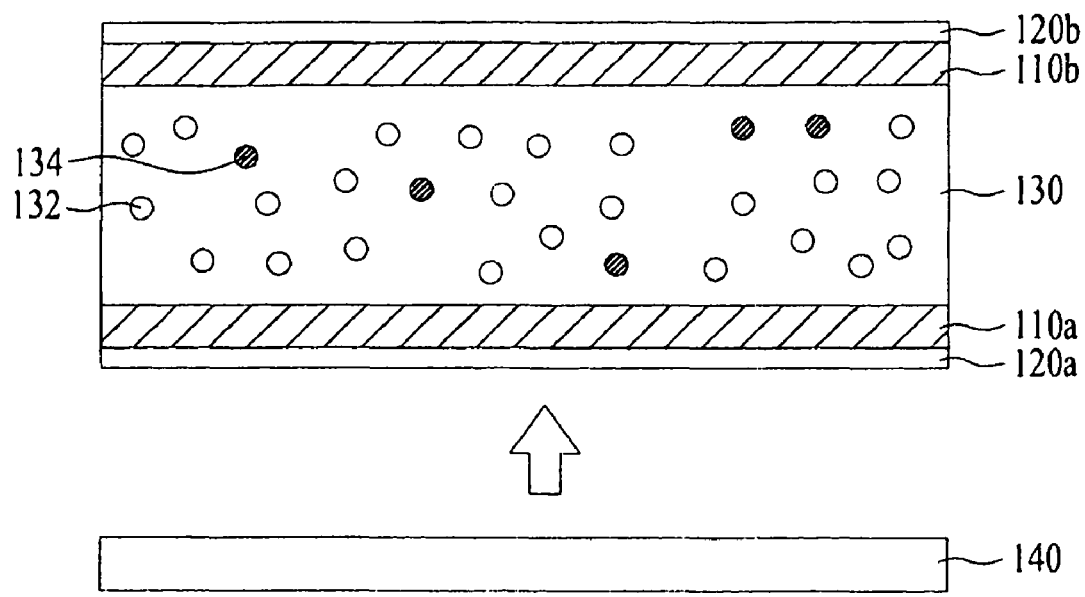
FIG. 4 is a sectional view illustrating an OFF-state of a liquid crystal display device according to a first embodiment of the present invention.
Figure 5:
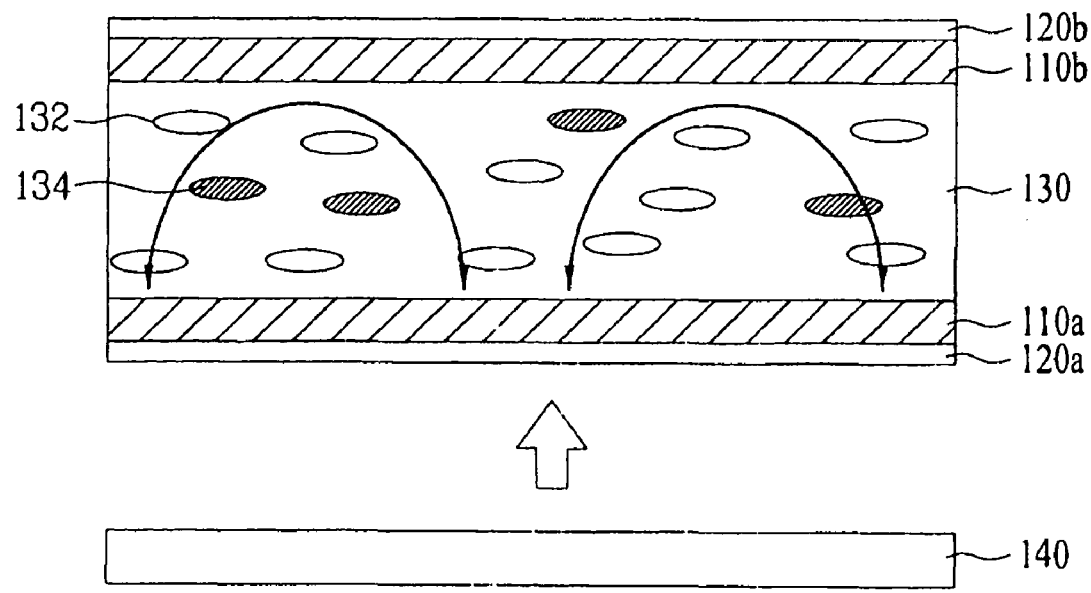
FIG. 5 is a sectional view illustrating an ON-state of a liquid crystal display device according to a first embodiment of the present invention.

FIGS. 4 and 5 are sectional views respectively illustrating an OFF-state, without application of a voltage, and an ON-state, with application of a voltage, in the liquid crystal display device according to the first embodiment of the present invention.

As can be seen from FIG. 4, light is irradiated from a backlight 140 positioned underneath the first substrate 110a in the OFF-state without application of a voltage.

When the irradiated light transmits the first polarizing film 120a, the light is linearly polarized so as to transmit only the light that oscillates parallel to the transmission axis of the first polarizing film 120a.

At this time, the first substrate 110a and the second substrate 110b are arranged to have the orientation parallel to the transmission axis of the first polarizing film 120a. Thus, the linearly polarized light is passed through the liquid crystal layer 130 without changing the oscillation direction.

The light passed through the second substrate 110b without the change of the oscillation direction cannot pass through the second polarizing film 120b placed to have a transmission axis perpendicular to the transmission axis of the first substrate, thereby displaying a black screen.

At this time, the liquid crystal layer 130 contains the dichroic dye 134 in addition to the liquid crystal molecules 132, and the dichroic dye 134 is aligned parallel to the liquid crystal molecules.

That is, the long axes of the dichroic dye 134 molecules are aligned parallel to the oscillation direction of the linearly polarized light. Thus, a part of the linearly polarized light is absorbed by the dichroic dye so as to reduce the black luminance even more.

Subsequently, as shown in FIG. 5, when a voltage is applied to the liquid crystal layer 130, the liquid crystal molecules 132 of the liquid crystal layer 130 are aligned parallel to the electric field.

When the liquid crystal molecules 132 align parallel to applied electric field, the light being linearly polarized by transmitting through the first polarizing film 120a passes through the liquid crystal layer 130 where the oscillation direction of the light rotates 90° from the oscillation direction of the linearly polarized light.

The light whose oscillation direction rotated 90° can pass through the second polarizing film 120b having the transmission axis perpendicular to the transmission axis of the first polarizing film 120a, thereby displaying a white screen.

At this time, the dichroic dye 134 included in the liquid crystal layer 130 is aligned parallel to the liquid crystal molecules, that is, parallel to the applied electric field. Thus, when the orientation of the liquid crystal molecules 132 changes by the applied electric field, the orientation of the dichroic dye 134 also changes such that the long axes of the dichroic dye 134 molecules align perpendicular to the oscillation direction of the light passing through the liquid crystal layer 130.

The light oscillating perpendicular to the long axes of the dichroic dye 134 molecules is barely absorbed by the dichroic dye 134, thereby displaying a white screen, and at the same time, minimizing the reduction of luminance by the dichroic dye 134.

The above-mentioned liquid crystal display device according to the first embodiment of the present invention described the in-plane switching mode liquid crystal display device. However, the device may be applied in the same manner for a fringe field switching mode liquid crystal display device.

Next, a liquid crystal display device according to a second embodiment of the present invention will be described.

Figure 6:
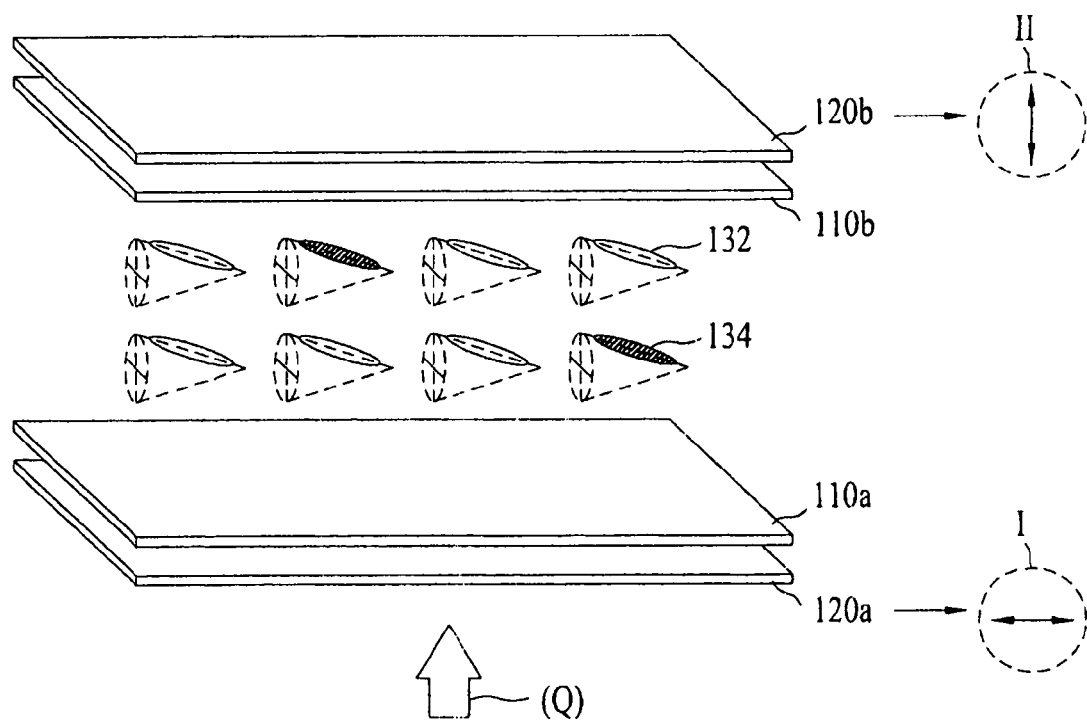
FIG. 6 is a perspective view illustrating an OFF-state of a liquid crystal display device according to a second embodiment of the present invention.

FIG. 6 is a perspective view illustrating the case without application of a voltage in the liquid crystal display device according to the second embodiment of the present invention.

The liquid crystal display device according to the second embodiment of the present invention is a ferroelectric liquid crystal display device including a first substrate 110*a* equipped with a first polarizing film 120*a* having a transmission axis I in a first direction, the first substrate 110*a* having an orientation parallel to the first direction I, a second substrate 110*b* equipped with a second polarizing film 120*b* having a transmission axis II perpendicular to the transmission axis I in the first direction, the second substrate 120*b* having an orientation parallel to the first direction, a liquid crystal layer 130 disposed between the first substrate 110*a* and the second substrate 110*b*, and a backlight unit (not shown) for irradiating light from underneath the first substrate 110*a*. Here, the liquid crystal layer 130 is formed of a ferroelectric liquid crystal including smetic liquid crystal molecules 132, and contains a dichroic dye 134.

The first substrate 110*a* and the second substrate 110*b* include a thin film transistor array substrate and a color filter substrate, respectively.

The thin film transistor array substrate includes a plurality of gate lines, a plurality of data lines intersecting the gate lines to define a pixel region, a thin film transistor formed on the intersection region of the gate line and the data line, and a pixel electrode connected with the thin film transistor.

The color filter substrate includes a black matrix formed to define a pixel region that corresponds with the pixel region in the thin film transistor array region, a color filter formed in the pixel region, and a common electrode formed on the overall surface of a substrate including the black matrix and color filter.

The common electrode is made of a transparent conductive substance, for example, indium-tin-oxide (ITO) or indium-zinc-oxide (IZO).

By forming the pixel electrode and the common electrode respectively on different substrates, the ferroelectric liquid crystal is driven by a perpendicular electric field in the liquid crystal display device according to the second embodiment of the present invention.

The first substrate and the second substrate are arranged so as to have their orientations parallel to each other, and the liquid crystal layer to be disposed between the substrate pair is uniformly aligned in the horizontal direction.

Next, an OFF-state, without application of a voltage, and an ON-state, with application of a voltage, in the liquid crystal display device according to the second embodiment of the present invention will be described with reference to FIGS. 6, 7A, and 7B.

Figure 7A:
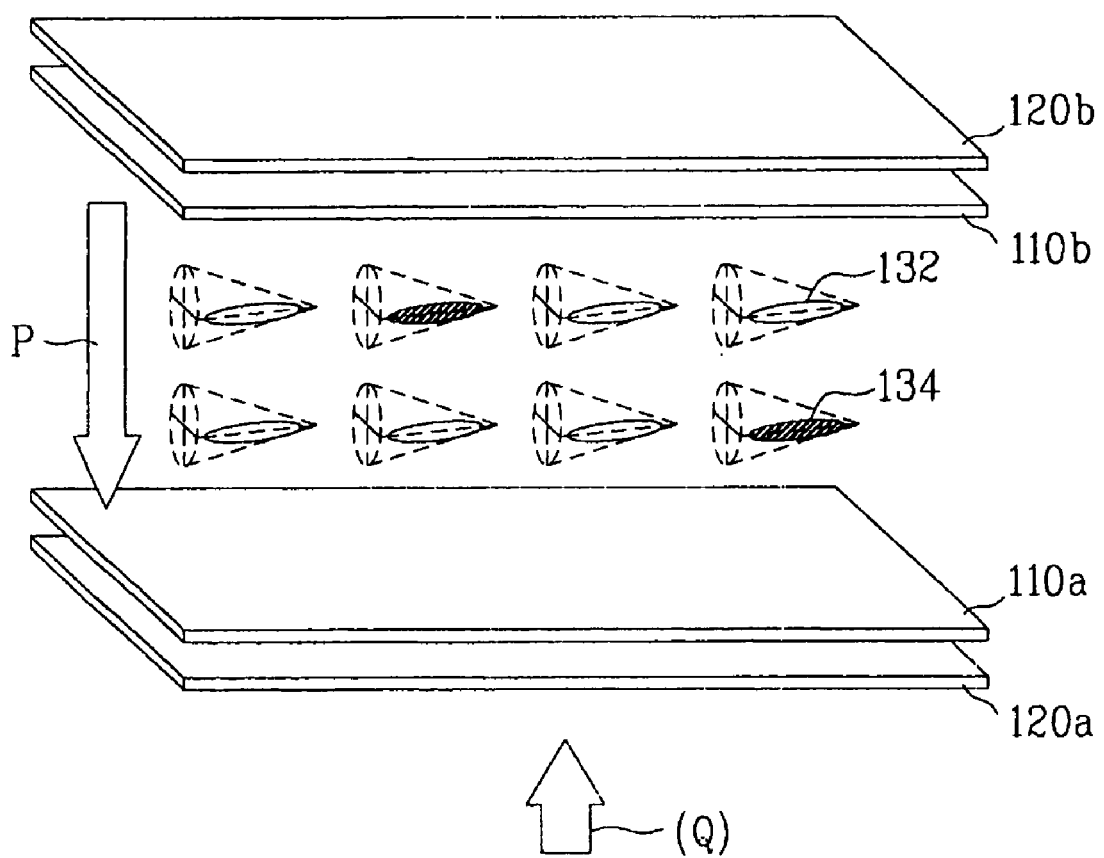
FIGS. 7A and 7B are perspective views illustrating an ON-state of a liquid crystal display device according to a second embodiment of the present invention.
Figure 7B:
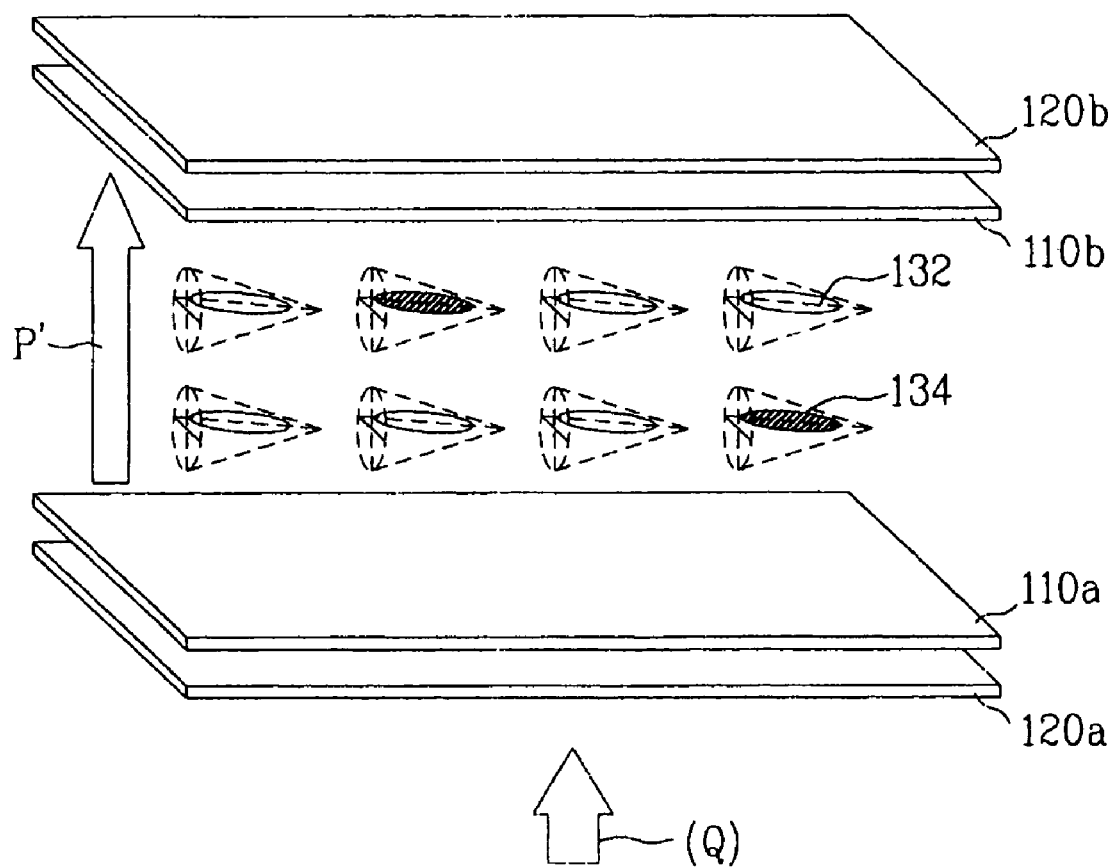

FIGS. 7A and 7B are perspective views illustrating the case with application of a voltage.

First, in the OFF-state without application of a voltage, as shown in FIG. 6, light irradiated from the backlight unit (not shown) positioned underneath the first substrate 110*a* is transmitted through the first polarizing film 120*a*, and the light is linearly polarized so as to transmit only the light that oscillates parallel to the transmission axis of the first polarizing film 120*a*.

The linearly polarized light passes through the liquid crystal layer without the change in its oscillation direction. The light transmitted the second substrate 110*b* without the change in the oscillation direction cannot pass through the second polarizing film 120*b* placed to have the transmission axis perpendicular to the transmission axis of the first substrate, thereby displaying a black screen.

The liquid crystal layer, as shown in FIG. 6, has rod-shaped smetic liquid crystal molecules 132. The liquid crystal molecules have orientational order as well as the positional order at the same time.

The liquid crystal has a plurality of layers in which a director of the liquid crystal molecules is arranged to be tilted with a certain angle with respect to the substrate. The long axes of the liquid crystal molecules in each layer are aligned parallel to the transmission axis II of the first polarizing film when seen from the direction of the incident light.

At this time, the dichroic dye 134 included in the liquid crystal layer is aligned parallel to the liquid crystal molecules 132 by a guest-host effect. The dichroic dye 134 provides an effect of reducing black luminance even more in the black screen by absorbing a part of the light that passes through the liquid crystal layer.

That is, the long axes of the dichroic dye molecules aligned parallel to the liquid crystal and the oscillation direction of the linearly polarized light are parallel to each other such that the linearly polarized light is absorbed to the dichroic dye molecules, thereby reducing black luminance.

Next, an ON-state with application of a voltage will be described.

FIG. 7A illustrates the case of applying a voltage of positive polarity to the common electrode and applying a voltage of negative polarity to the pixel electrode. On the contrary, FIG. 7B illustrates the case of applying a voltage of positive polarity to the pixel electrode and applying a voltage of negative polarity to the common electrode.

As can be seen from FIGS. 7A and 7B, when an electric field is generated between the common electrode and the pixel electrode formed on a respective substrate, the liquid crystal molecules in the liquid crystal layer changes their orientation by the electric field.

More particularly, the liquid crystal molecules perform cone motion, as shown in FIGS. 7A and 7B, in which each molecule rotates along the imaginary cylinder surface with one end of the long axis of the liquid crystal molecule fixated. The rotational direction of the cone motion is determined by the direction of an electric field.

That is, as shown in FIG. 7A, when an electric field P is generated in the direction from the common electrode to the pixel electrode, the liquid crystal molecules perform the 90° cone motion clockwise. On the other hand, when an electric field P' is generated in the direction from the pixel electrode to the common electrode, the liquid crystal molecules perform the 90° cone motion counterclockwise.

When the liquid crystal molecules rotate by the cone motion, the long axes of the liquid crystal molecules are aligned parallel to the transmission axis I of the first polarizing film 120*a* when seen from the screen direction. The linearly polarized light passed through the first polarizing film becomes elliptically polarized light by passing through the liquid crystal layer.

The direction of the elliptically polarized light is determined by a phase difference caused by a cell gap, or the like.

The elliptically polarized light passed through the liquid crystal layer transmits only the light parallel to the transmission axis of the second polarizing film, thereby displaying a white screen.

Thus, the liquid crystal display device according to the second embodiment of the present invention included the dichroic dye in the ferroelectric liquid crystal to have effects capable of displaying vivid images having a high contrast ratio by reducing black luminance of the black screen in addition to realizing the liquid crystal display device with a high response rate.

Meanwhile, it will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The liquid crystal display device according to the present invention has the first and the second polarizing film arranged such that the respective transmission axes are perpendicular to each other, without any additional process. By forming the orientation of the substrate disposed in the direction of incident light parallel to the transmission axis of the polarizing film placed on the substrate, as well as adding the dichroic dye to the liquid crystal layer, the black luminance is reduced without application of a voltage, thereby providing the liquid crystal display device for displaying vivid images.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device comprising:
a first substrate including a first alignment film and a first polarizing film having a first transmission axis parallel to an alignment direction of the first alignment film;
a second substrate including a second alignment film and a second polarizing film having a second transmission axis perpendicular to the first transmission axis of the first polarizing film; and
a liquid crystal layer between the first and second substrates, the liquid crystal layer including a dichroic dye,
wherein liquid crystal molecules are aligned in a horizontal direction when a voltage is applied to the liquid crystal layer, and when the voltage is not applied to the liquid crystal layer, the dichroic dye is aligned parallel to the liquid crystal molecules included in the liquid crystal layer and absorbs a part of a linearly polarized light from the first polarizing film.

2. The device according to claim 1, wherein the first substrate has a pixel electrode and a common electrode.

3. The device according to claim 2, wherein the liquid crystal display device is an in-plane switching mode device or a fringe field switching mode device.

4. The device according to claim 1, wherein the liquid crystal layer is a ferroelectric liquid crystal.

5. The device according to claim 4, wherein the first substrate has a pixel electrode and the second substrate has a common electrode.

6. The device according to claim 1, wherein the dichroic dye is any one of an azo-based, azo-stilbene-based, benzothiazolyl polyazomethine-based, azomethine-based, merocyanine-based, methine-arylidene-based, tetrazine-based, oxadiazine-based, carbarzole-azo-based, amino-based and anthraquinon-based dichroic dye.

7. The device according to claim 6, wherein the azo-based dichroic dye is an azo-based compound represented by the following formula I:

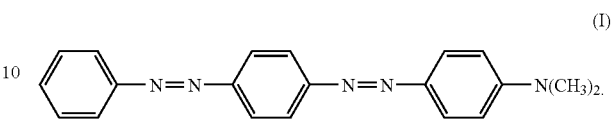

(I)

8. The device according to claim 6, wherein the anthraquinone-based dichroic dye is a compound represented by the following formula II or formula III:

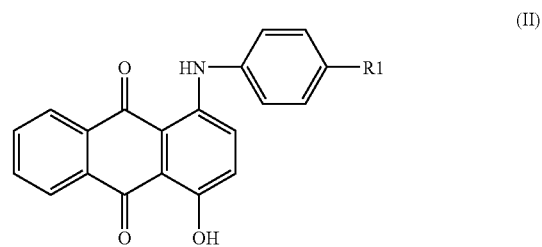

(II)

wherein, R1 is any one group from C4H9, OC9H19, or N(CH3)2, and

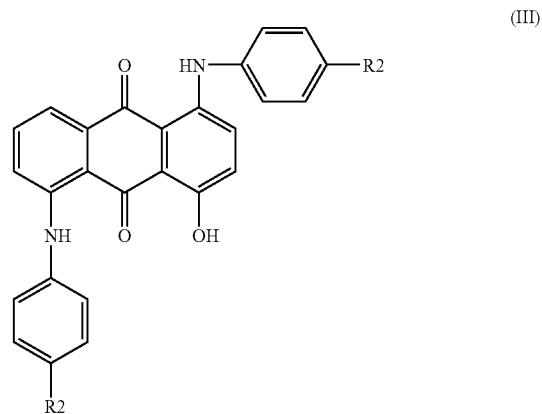

(III)

wherein, R2 is any one group from C2H5, C4H9, OC5H 1, N(CH3)2, or CH(CH3)2.

9. The device according to claim 6, wherein the amino-based dichroic dye is a nitro-amino-biphenyl-based compound represented by the following formula IV or a nitro-amino tolane-based compound represented by the following formula V:

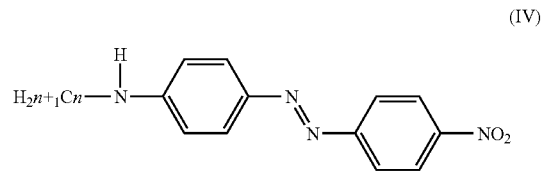

(IV)

wherein, n is a natural number, and

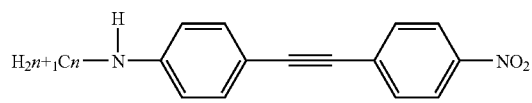 (V)

wherein, n is a natural number.

10. The device according to claim 1, wherein the dichroic dye absorbs light that oscillates parallel to the long or short axis of the dye molecule.

11. The device according to claim 1, wherein the dichroic dye is added in an amount of 10% by weight or less.

12. The device according to claim 1, wherein the dichroic dye is added in an amount of 1% by weight or less.

* * * * *